United States Patent
Tanaka

(10) Patent No.: US 8,885,087 B2
(45) Date of Patent: Nov. 11, 2014

(54) LENS SYSTEM THAT IS COMMUNICABLE WIRELESSLY

(75) Inventor: Isao Tanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 566 days.

(21) Appl. No.: 12/973,027

(22) Filed: Dec. 20, 2010

(65) Prior Publication Data
US 2011/0157461 A1 Jun. 30, 2011

(30) Foreign Application Priority Data
Dec. 28, 2009 (JP) ................................. 2009-298394

(51) Int. Cl.
*H04N 5/232* (2006.01)
*G03B 13/00* (2006.01)
*G02B 7/10* (2006.01)

(52) U.S. Cl.
CPC .................................. *G02B 7/102* (2013.01); *H04N 5/23209* (2013.01)
USPC ........................................................ 348/345

(58) Field of Classification Search
USPC ................................................. 348/373, 345
See application file for complete search history.

(56) References Cited

U.S. PATENT DOCUMENTS

| | | | |
|---|---|---|---|
| 6,674,955 B2 * | 1/2004 | Matsui et al. | 386/281 |
| 7,565,680 B1 * | 7/2009 | Asmussen | 725/135 |
| 7,636,518 B2 * | 12/2009 | Tanaka et al. | 396/56 |
| 2007/0254640 A1 * | 11/2007 | Bliss | 455/420 |
| 2008/0310039 A1 * | 12/2008 | Tanaka | 359/823 |

FOREIGN PATENT DOCUMENTS

| | | |
|---|---|---|
| JP | 8-334673 A | 12/1996 |
| JP | 10-164422 A | 6/1998 |
| JP | 2002-280925 A | 8/2002 |
| JP | 2006-238020 A | 9/2006 |
| JP | 2007-293070 A | 11/2007 |

OTHER PUBLICATIONS

Search report issued in corresponding EP application No. 10196717.2-2217, dated Mar. 18, 2011.

* cited by examiner

*Primary Examiner* — Gary C Vieaux
(74) *Attorney, Agent, or Firm* — Rossi, Kimms & McDowell LLP

(57) ABSTRACT

A lens system has a lens apparatus with a first wireless communication unit that communicates with a second wireless communication unit of a command apparatus, which wirelessly communicates with the lens apparatus to control the lens apparatus. The lens apparatus has a first setting unit that sets the first wireless communication as slave when the lens apparatus is initialized. The command apparatus has a second setting unit that sets the second wireless communication unit as master when the commanding apparatus is initialized, and the lens apparatus includes a data reduction unit that reduces data sent from the first to the second wireless unit.

43 Claims, 9 Drawing Sheets

LENS SYSTEM THAT IS COMMUNICABLE WIRELESSLY

BACKGROUND OF THE INVENTION

1. Field of the Invention

The present invention relates to a lens system for electrically driving a movable optical member in response to a drive command from a commanding apparatus, and more particularly, to a broadcasting television lens system.

2. Description of the Related Art

Heretofore, a television lens used for television broadcast is detachably attachable to a television camera. The television lens includes multiple movable optical members for variable adjustments of zooming and focusing as like. The movable optical members may be electrically driven in response to commands from a commanding apparatus. There are exemplified, as the commanding apparatus, a zoom demand for variable adjustment of zooming and a focus demand for variable adjustment of focusing. The television lens is usually connected to the zoom demand and the focus demand through cables. A structure of the conventional television lens described above is illustrated in FIG. 6 included in Japanese Patent Application Laid-Open No. H08-334673.

Further, Japanese Patent Application Laid-Open No. 2007-293070 proposes a lens system in which the television lens is wirelessly connected to the zoom demand and the focus demand, to thereby enhance ease of operation and maintenance, and to improve reliability.

When a wireless communication function described in Japanese Patent Application Laid-Open No. 2007-293070 is provided to establish wireless connection between the lens apparatus and the commanding apparatus, a battery is used as a power supply on the commanding apparatus side. Japanese Patent Application Laid-Open No. 2007-293070 describes that a wireless LAN, Bluetooth system, or a Zigbee system are used as a wireless communication system.

Each of the wireless communication systems is a master/slave communication system. That is, periodic polling from an apparatus side set as a master to an apparatus side set as a slave is performed. Data communication from the master to the slave is performed after activation of the polling. Communication from the slave side to the master side is performed in response to the polling. However, Japanese Patent Application Laid-Open No. 2007-293070 does not describe a method of determining which communication apparatus is set as the master or the slave.

Japanese Patent Application Laid-Open No. 2002-280925 discloses a master-slave setting method for a wireless communication apparatus.

In Japanese Patent Application Laid-Open No. 2002-280925, when the wireless communication apparatus is supplied with power from an AC adapter, the wireless communication apparatus is set as the master. When the wireless communication apparatus is supplied with power from a battery, the wireless communication apparatus is set as the slave, to thereby reduce electric consumption when battery-operated.

Consideration is given to a case where a master/slave setting is made for a wireless communication function as in Japanese Patent Application Laid-Open No. 2002-280925 in the structure described in Japanese Patent Application Laid-Open No. 2007-293070. The commanding apparatus side is battery-operated, and hence the wireless communication function of the commanding apparatus side is set as the slave function.

When the wireless communication function of the commanding apparatus side is set as the slave function, low electric consumption is achieved, and hence the availability of the battery is improved. However, a command signal is sent after polling from the master side which is the lens apparatus, which leads to a problem that responsiveness is deteriorated.

The commanding apparatus is categorized into two types, namely, an analog demand for sending an analog signal as a command value to the lens apparatus and a digital demand for sending the command value to the lens apparatus through digital communication. When the lens apparatus and the commanding apparatus are wirelessly connected to each other by the wireless communication function, the amount of data sent from the commanding apparatus to the lens apparatus varies between the analog demand and the digital demand. In general, the amount of data in the digital demand is several times larger than the amount of data in the analog demand. Therefore, when the lens apparatus and the commanding apparatus are wirelessly connected to each other by the wireless communication function, there arises a problem that the responsiveness in the digital demand is further deteriorated as compared with the responsiveness in the analog demand.

SUMMARY OF THE INVENTION

The present invention has been made in view of the problems as described above, and it is an object of the present invention to provide a lens system which is excellent in responsiveness in a case where a lens apparatus and a commanding apparatus are wirelessly connected to each other by a wireless communication function. It is another object of the present invention to provide a lens system which is excellent in responsiveness even in a case where any one of an analog demand and a digital demand is used as the commanding apparatus.

In order to attain the above-mentioned objects, the present invention provides a lens system, including: a lens apparatus including a member whose position or state varies continuously; and a commanding apparatus for outputting a command signal to the member, in which the lens apparatus includes: a first wireless communication unit which can perform wireless communication through a master/slave communication system; and a first set unit for setting the first wireless communication unit as a slave when the lens apparatus is initialized; the lens apparatus sends to the commanding apparatus an answer data on the member whose position or state varies continuously; the commanding apparatus includes: a second wireless communication unit which can perform wireless communication through the master/slave communication system and communicates with the first wireless communication unit; and a second set unit for setting the second wireless communication unit as a master when the commanding apparatus is initialized; and the lens apparatus includes a data reduction unit for deleting a part of the answer data which is sent from the first wireless communication unit to the second wireless communication unit.

Further features of the present invention will become apparent from the following description of exemplary embodiments with reference to the attached drawings.

According to the present invention, a wireless communication function of the lens apparatus side is always set as the slave and a wireless communication function of the commanding apparatus side is always set as the master. Therefore, the command signal may be immediately sent from the commanding apparatus to the lens apparatus, and hence a lens system which is excellent in responsiveness may be provided.

When the amount of command data sent from the commanding apparatus to the lens apparatus is increased, the amount of data to be sent from the wireless communication function of the lens apparatus side to the wireless communication function of the commanding apparatus side is reduced. Therefore, the command data is prevented from being delayed, and hence a lens system which is excellent in responsiveness may be provided even in a case of the digital demand.

Further features of the present invention will become apparent from the following description of exemplary embodiments with reference to the attached drawings.

DESCRIPTION OF THE EMBODIMENTS

Hereinafter, embodiments of the present invention are described in detail with reference to the attached drawings.

First Embodiment

Figure 1:
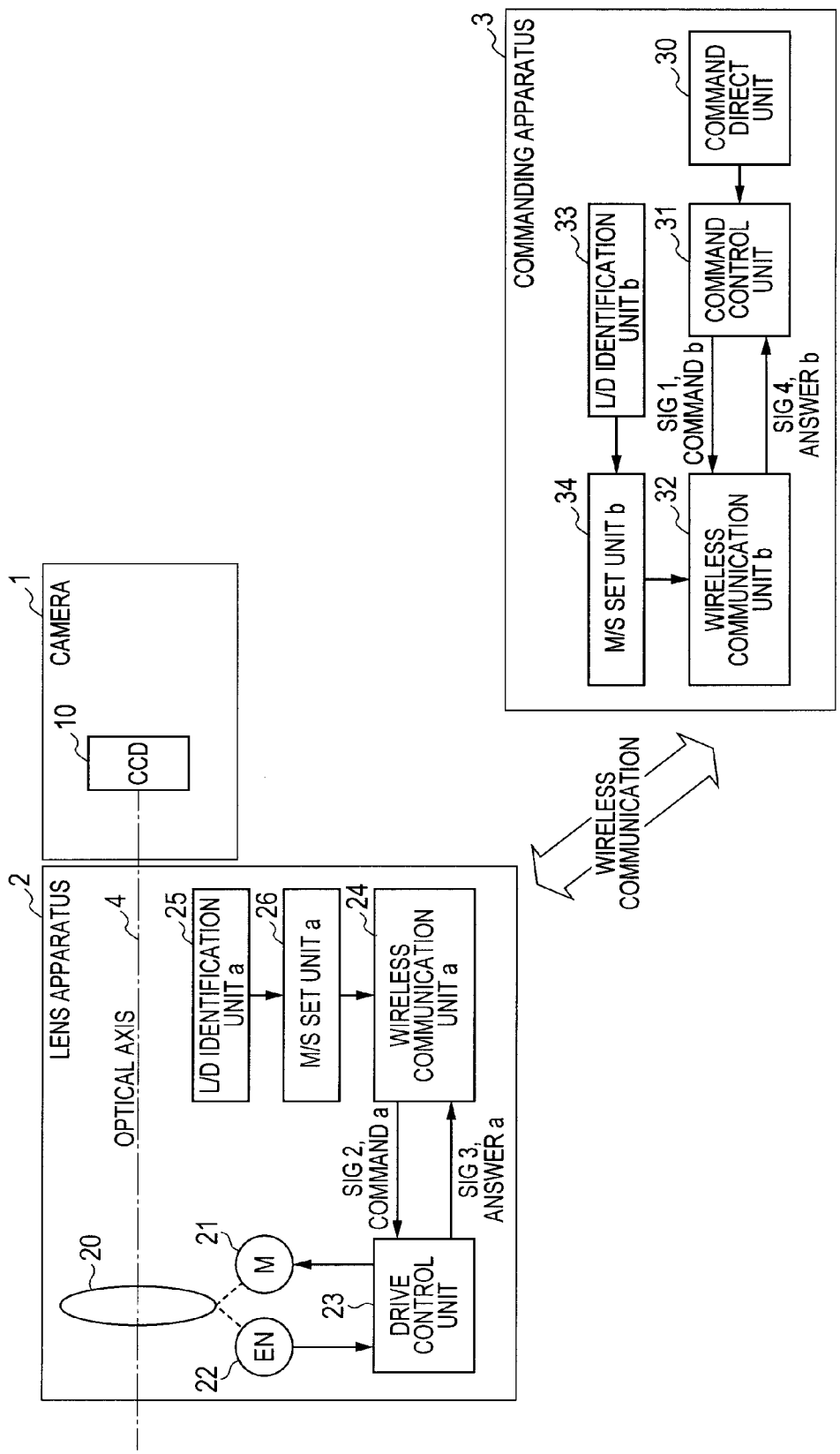
FIG. 1 is a block diagram illustrating a structure according to a first embodiment of the present invention.

FIG. 1 is a block diagram illustrating a structure according to a first embodiment of the present invention.

A television lens (lens apparatus) 2 is detachably attached to a television camera (image pickup apparatus main body or camera main body) 1 which is an image pickup unit, and performs wireless communication with a commanding apparatus 3 which is a zoom demand or a focus demand each serving as an external device.

An image pickup element 10 is a CCD or a CMOS device.

An internal structure of the television lens 2 is described. A movable optical member 20 is disposed on an optical axis 4 common to the television camera 1 and the television lens 2, and moved in an optical axis direction, to thereby perform zoom and focus adjustments. The movable optical member 20 is driven by a motor 21. A position of the movable optical member 20 in the optical axis direction is detected by an encoder 22. A drive control unit 23 generates a drive signal for driving the motor 21 in response to a command-a (Sig2) from the commanding apparatus 3 and a position signal obtained from the encoder 22. A wireless communication unit-a (first wireless communication unit) 24 is a wireless unit for performing wireless communication through a master/slave communication system, and outputs, as the command-a (Sig2), the command signal received from the commanding apparatus 3, to the drive control unit 23. The drive control unit 23 outputs an answer-a (Sig3), which is an answer signal corresponding to the position information of the movable optical member, to the wireless communication unit-a 24. Then, the wireless communication unit-a 24 sends the answer-a (Sig3) to the commanding apparatus 3. A lens/demand identification unit-a 25 outputs, to a master/slave set unit-a (first set unit) 26, a signal indicating that an apparatus to which the wireless communication unit-a 24 is attached is the lens apparatus 2. The master/slave set unit-a 26 sets the wireless communication unit-a 24 as a slave.

Here, the movable optical member 20 includes a magnification-varying lens unit which moves during zooming, a focus lens unit which moves during focusing, a stop, and an extender (focal-length-varying optical system which varies a focal length by its insertion to or removal from an optical path).

A structure of the commanding apparatus 3 is described. A command direct unit 30 includes thumb rings and switches in a case of the zoom demand or knobs and switches in a case of the focus demand. A command signal from the command direct unit 30 is input to a command control unit 31, subjected to arithmetic processing and command processing, and then output as a command-b (Sig1) to a wireless communication unit-b 32. The wireless communication unit-b (second wireless communication unit) 32 is a wireless unit for performing wireless communication through the master/slave communication system. The wireless communication unit-b 32 sends a send signal to the wireless communication unit-a 24 of the television lens 2. An answer signal from the wireless communication unit-a 24 of the television lens 2 is received by the wireless communication unit-b 32 and sent as an answer-b (Sig4) to the command control unit 31. A lens/demand identification unit-b 33 outputs, to a master/slave set unit-b (second set unit) 34, a signal indicating that an apparatus to which the wireless communication unit-b 32 is attached is the commanding apparatus 3. The master/slave set unit-b 34 sets the wireless communication unit-b 32 as a master.

During the normal operation using the structure described above, the command signal generated by operating the command direct unit 30 of the commanding apparatus 3 is transferred to the drive control unit 23 through the command control unit 31, the wireless communication unit-b 32, and the wireless communication unit-a 24, to thereby drive the movable optical member 20. In addition, the drive control unit 23 generates the position signal of the movable optical member 20 in response to a pulse signal from the encoder 22. The position signal and signals indicating various states of the television lens 2 are each transferred as the answer signal to the command control unit 31 through the wireless communication unit-a 24 and the wireless communication unit-b 32.

Figure 2:
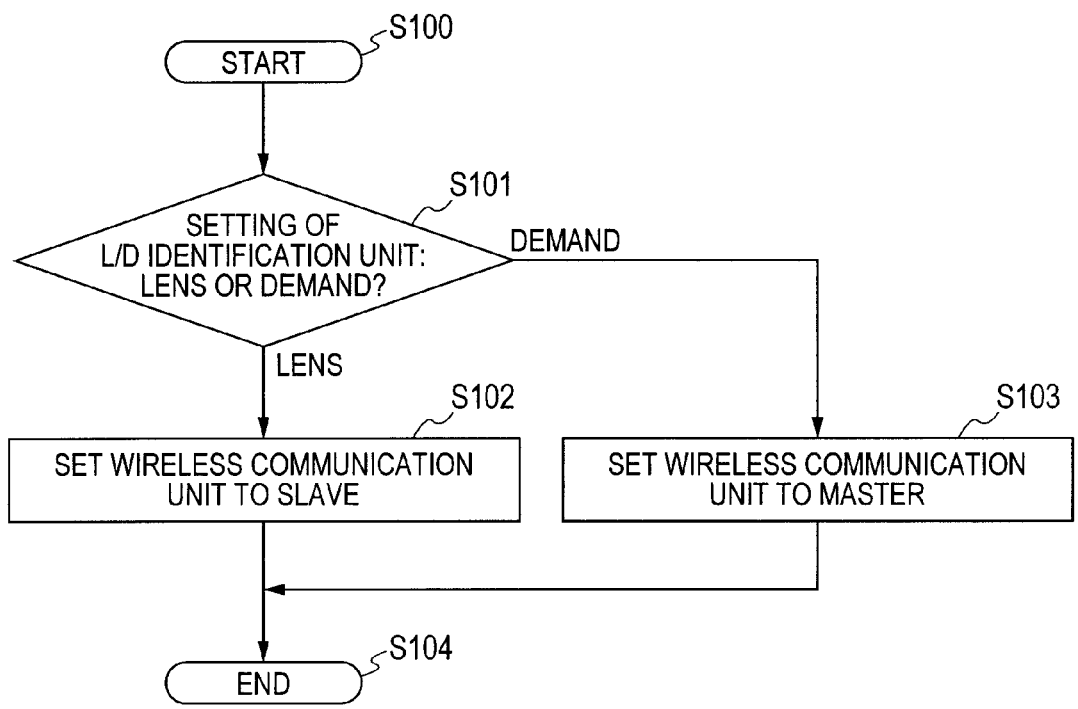
FIG. 2 is a flowchart illustrating a master/slave setting process in the first embodiment of the present invention.

FIG. 2 is a flowchart illustrating a master/slave setting flow for determining which of the wireless communication unit-a 24 and the wireless communication unit-b 32 is set as the master or the slave. The master/slave setting flow illustrated in FIG. 2 is executed before the wireless communication unit-a 24 and the wireless communication unit-b 32 are brought into a connectable state, and executed to define an initial state of the wireless communication unit-a 24 and an initial state of the wireless communication unit-b 32 at the time of initialization including power-on or forced reset processing.

In the master/slave setting flow illustrated in FIG. 2, the processing starts in Step S100, and proceeds to Step S101. In Step S101, the lens/demand identification unit-a 25 and the lens/demand identification unit-b 33 determine whether setting is to be made for the wireless communication unit-a provided in the television lens 2 or the wireless communication unit-b provided in the commanding apparatus 3. When the setting is to be made for the wireless communication unit-a provided in the television lens 2, the processing proceeds to Step S102. When the setting is to be made for the wireless communication unit-b provided in the commanding apparatus 3 which is the demand, the processing proceeds to Step S103. In Step S102, the wireless communication unit is set as the slave, and the processing proceeds to Step S104. In Step S103, the wireless communication unit is set as the master, and the processing proceeds to Step S104. The processing Step ends in Step S104. When the master/slave setting flow illustrated in FIG. 2 is executed, the wireless communication unit-a 24 of the television lens 2 is set as the slave and the wireless communication unit-b 32 of the commanding apparatus 3 is set as the master. When the wireless communication unit-a 24 and the wireless communication unit-b 32 are set as the slave and the master, respectively, based on the master/slave setting flow illustrated in FIG. 2, the wireless communication between the television lens 2 and the commanding apparatus 3 is activated.

As described above, according to the structural block diagram of FIG. 1 and the master/slave setting flow illustrated in FIG. 2, the wireless communication unit-a 24 of the lens apparatus side may be set as the slave and the wireless communication unit-b 32 of the commanding apparatus side may be set as the master. Therefore, the command signal may be sent from the commanding apparatus 3 to the lens apparatus 2, immediately after the time of initialization processing including power-on or forced reset processing, and hence a lens system which is excellent in responsiveness may be provided.

The lens/demand identification unit-a 25 and the lens/demand identification unit-b 33 illustrated in FIG. 1 may be realized as setting switches or may be set in advance by a computer.

In addition, reduction of signal amount (data amount) between the wireless communication unit on the lens apparatus side and that on the commanding apparatus side is not described in the first embodiment. However, it is preferable to perform the reduction of signal amount. The reduction of signal amount (reduction of part of data) is mainly performed for signals (data, response signals) sent from the lens apparatus side to the commanding apparatus side, so that the reduction of signal amount should not be performed for signals (data, command signals) sent from the commanding apparatus side to the lens apparatus side. A method of the reduction of signal amount is described in the second and third embodiments.

Second Embodiment

Figure 3:
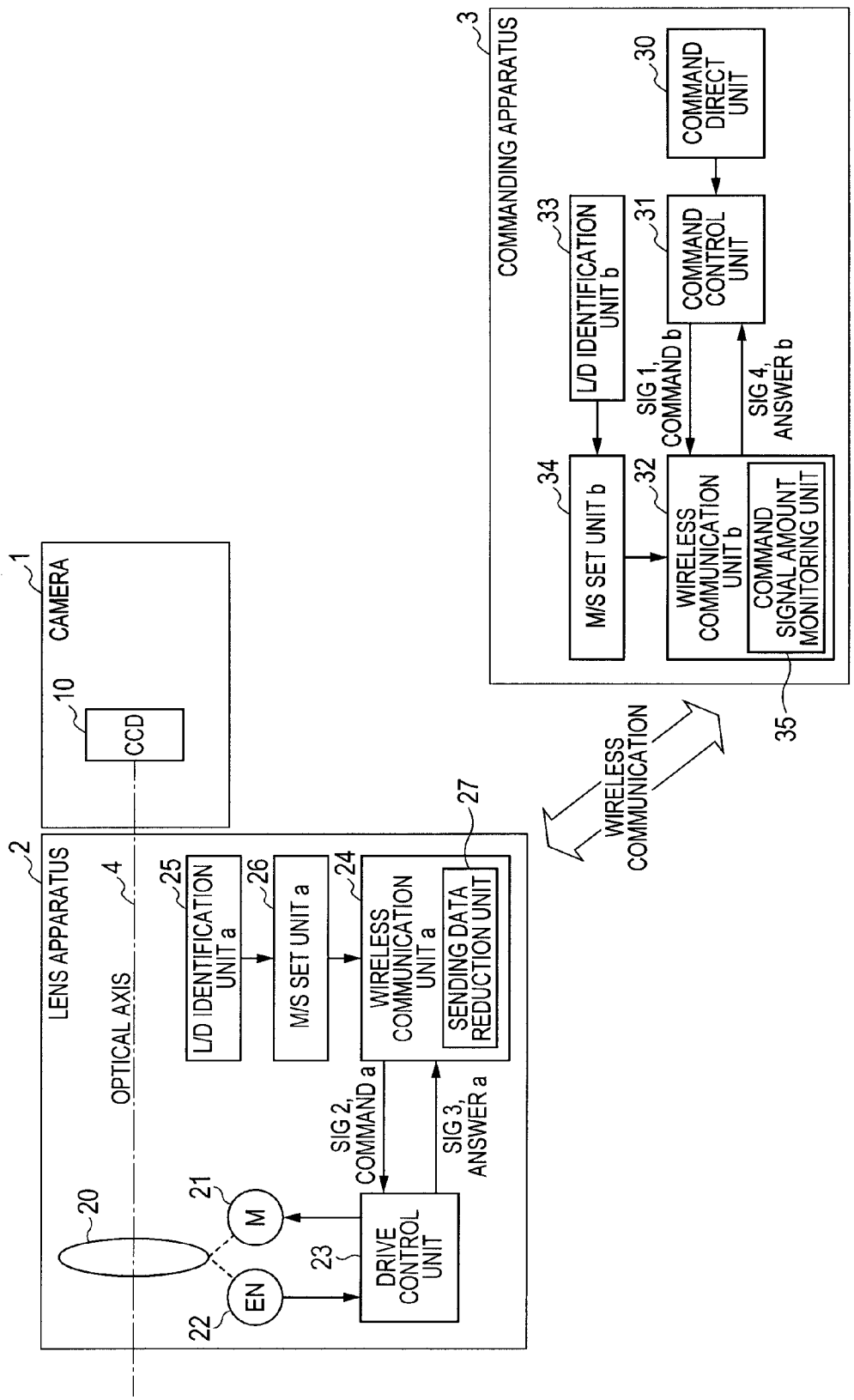
FIG. 3 is a block diagram illustrating a structure according to a second embodiment of the present invention.

FIG. 3 is a block diagram illustrating a structure according to a second embodiment of the present invention. The same blocks as the structural blocks in the first embodiment illustrated in FIG. 1 are denoted by the same reference number. The blocks denoted by the same reference number may be similarly described as in the first embodiment, and hence the description thereof is omitted. FIG. 3 is different from FIG. 1 in that a sending data reduction unit 27 and a command signal amount monitoring unit 35 are further provided in the wireless communication unit-a 24 and the wireless communication unit-b 32, respectively.

Figure 4:
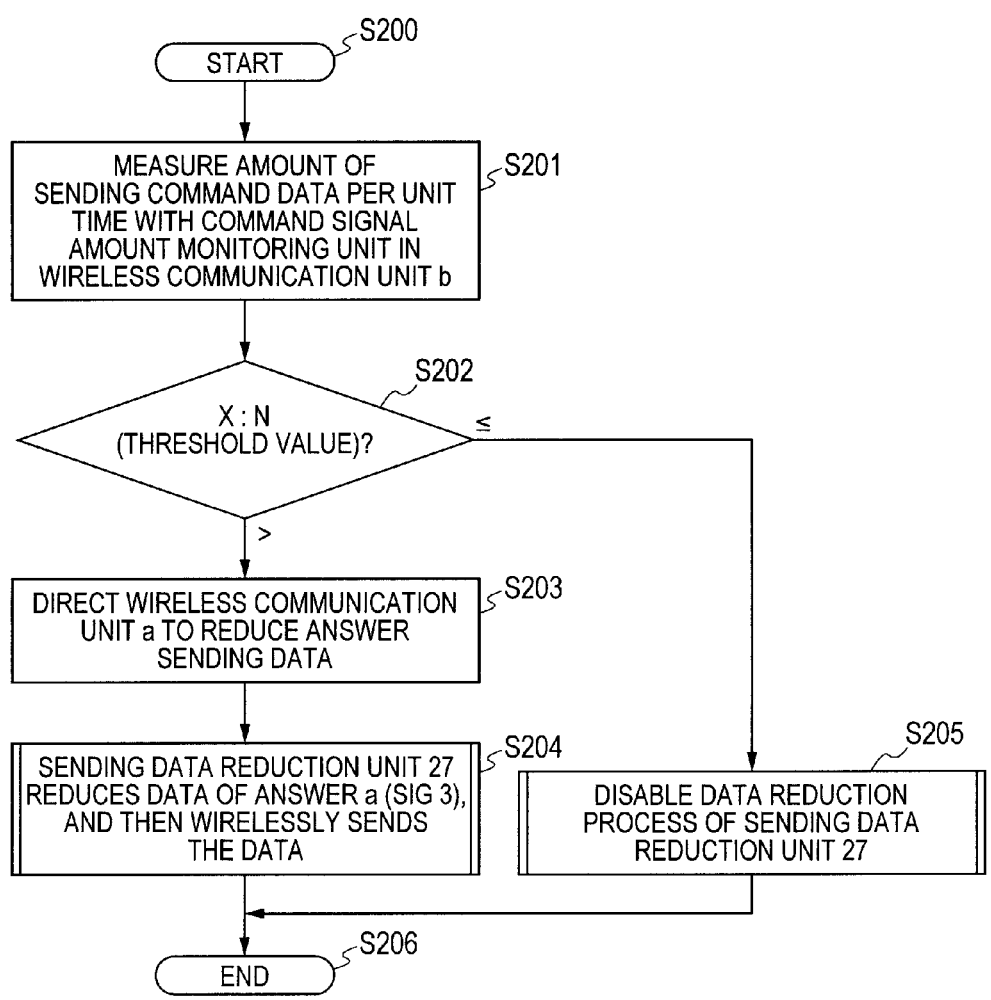
FIG. 4 is a process flowchart in the second embodiment of the present invention.

FIG. 4 is a process flowchart illustrating operations of the sending data reduction unit 27 and the command signal amount monitoring unit 35 in the structural block diagram of FIG. 3.

In FIG. 4, the processing starts in Step S200. Assume that, before the start of the processing, the master/slave setting flow illustrated in FIG. 2 is completed and normal wireless communication is in a connection state. In Step S201, a data amount X, for example, the number of bytes, of a sending command signal sent from the wireless communication unit-b 32 to the wireless communication unit-a 24 per unit time is monitored (measured) by the command signal amount monitoring unit 35, and the processing proceeds to Step S202. In Step S202, the data amount X is compared with a predetermined threshold value N which is set in advance. When X>N, the processing proceeds to Step S203. When X≤N, the processing proceeds to Step S205. In Step S203, the processing in a case where a signal amount of the command-b (Sig1) from the commanding apparatus 3 is large (X>N) is performed. First, the wireless communication unit-a 24 on the television lens 2 side is directed to cause the sending data reduction unit to activate data reduction, and then the processing proceeds to S204. In Step S204, the answer-a (Sig3) of the answer signal is subjected to data reduction processing by the sending data reduction unit 27 as directed, and wirelessly sent to the commanding apparatus 3 side. Then, the processing proceeds to Step S206. In Step S205, the data reduction processing by the sending data reduction unit 27 is disabled, and the processing proceeds to Step S206. The processing ends in Step S206.

The data reduction processing performed by the sending data reduction unit 27 is a processing of performing reduction of the answer-a (Sig3) so that the data amount of the answer-a (Sig3), which is the position signal of the movable optical member and sent at regular intervals from the drive control unit 23 included in the television lens 2, is 1/m (m: arbitrary positive integer) of a data amount before reduction, and then sending the answer-a from the wireless communication unit-a 24 to the wireless communication unit-b 32 of the commanding apparatus 3.

As described above, according to the structural block diagram of FIG. 3 and the process flow illustrated in FIG. 4, the amount of command data sent from the commanding apparatus 3 to the television lens 2 per unit time is constantly monitored by the command signal amount monitoring unit 35 of the commanding apparatus 3. When the amount of command data per unit time is larger than a threshold value which is set in advance, the processing of reducing the amount of answer data sent from the television lens 2 to the commanding apparatus 3 is performed by the sending data reduction unit 27 included in the television lens 2. In this manner, a total communication amount between the wireless communication units per unit time is reduced, to thereby reduce a communication load. As a result, even in cases of not only an analog type demand but also a digital type demand of which the amount of command data is large, a lens system which is excellently responsive to the command from the commanding apparatus may be provided.

In this embodiment, the command signal amount monitoring unit 35 is included in the wireless communication unit-b 32 of the commanding apparatus 3. However, even in a case where the command signal amount monitoring unit 35 can be included in the wireless communication unit-a 24 of the lens apparatus 2, the same function can be obtained. In addition, the command signal amount monitoring unit does not necessarily monitor the actual amount of command signal. That is, the command signal amount monitoring unit can be a unit which monitors (determines) whether the wireless communication between the lens (lens apparatus) and the demand (commanding apparatus) is performed with digital signals, and also whether the communication in the demand between the operation unit by an user and the wireless communication unit (signal sending/receiving unit) which wirelessly communicates with the lens apparatus is performed through digital communication or analog communication. In the latter case (in which the communication between the operation unit and the wireless communication unit is performed through digital signal), the signal amount of digital communication is larger than that of analog communication, so that the answer data (response signal) amount is reduced.

In the description above, the threshold value N for the command signal amount monitoring unit 35 may be arbitrarily adjusted. Alternatively, a set switch may be provided to determine in advance whether or not the data reduction processing is always performed by the sending data reduction unit 27 without the comparison with the threshold value N.

Further, instead of comparing the data amount X with the threshold value N in the command signal amount monitoring unit 35, the positive integer m of 1/m, which is a reduction amount of the sending data reduction unit 27, may be adjusted in proportion to the data amount X.

Third Embodiment

Figure 5:
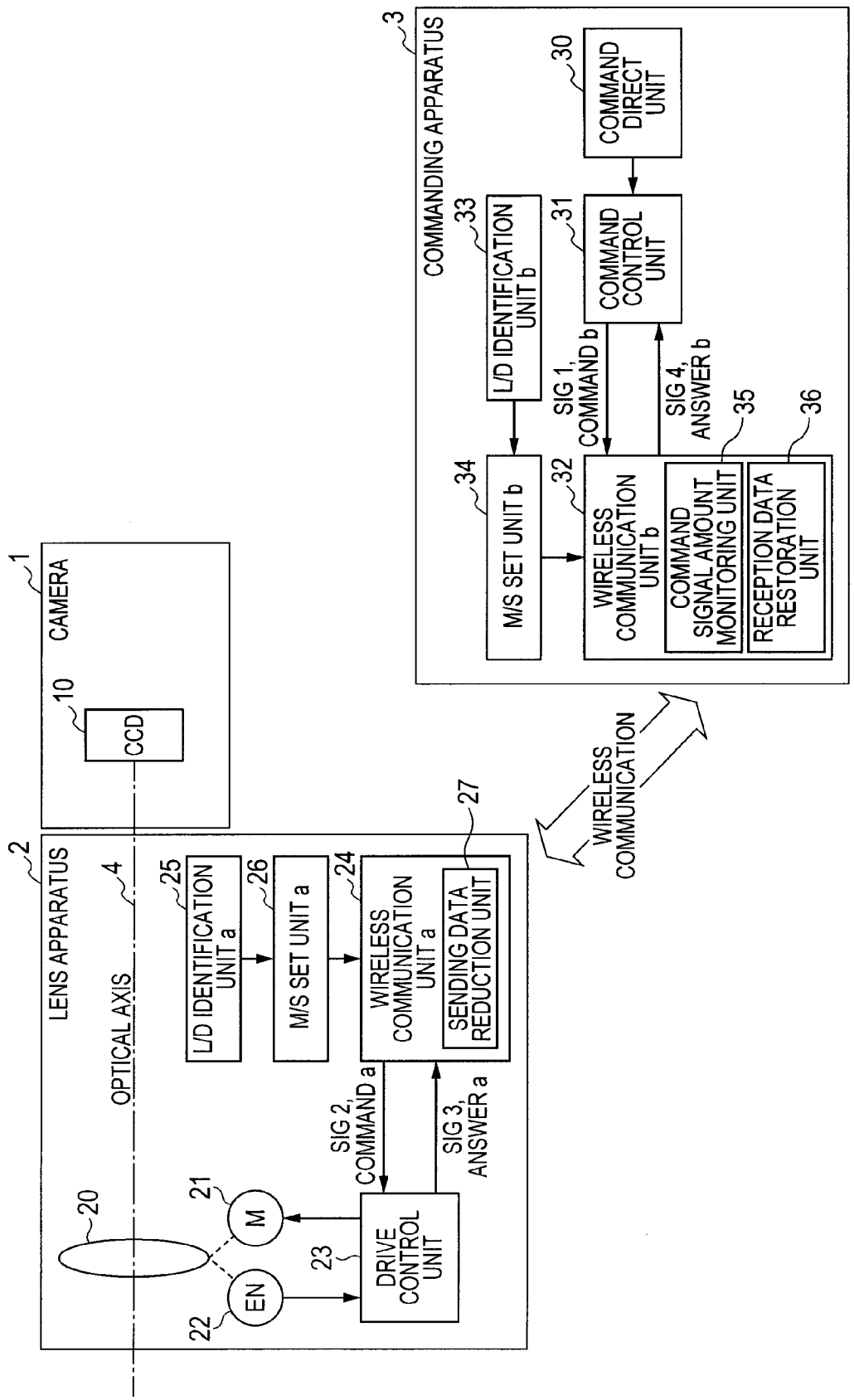
FIG. 5 is a block diagram illustrating a structure according to a third embodiment of the present invention.

FIG. 5 is a block diagram illustrating a structure according to a third embodiment of the present invention. The same blocks as the structural blocks in the second embodiment illustrated in FIG. 3 are denoted by the same reference number. The blocks denoted by the same reference number may be similarly described as in the first and second embodiments, and hence the description thereof is omitted. FIG. 5 is different from FIG. 3 in that a reception data restoration unit 36 is further provided in the wireless communication unit-b 32 of the commanding apparatus 3.

Figure 6:
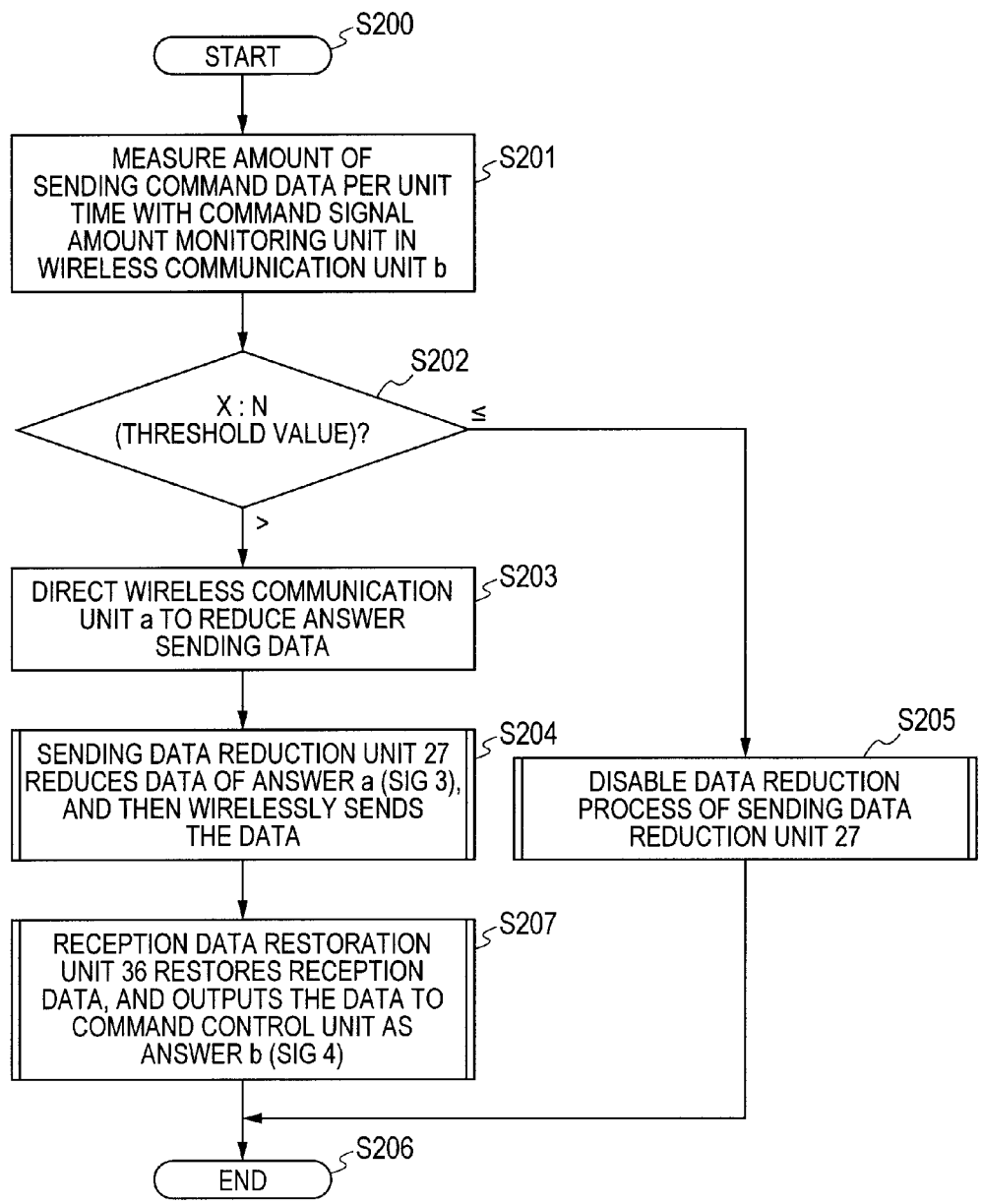
FIG. 6 is a process flowchart in the third embodiment of the present invention.

FIG. 6 is a process flowchart illustrating operations of the sending data reduction unit 27, the command signal amount monitoring unit 35, and the reception data restoration unit 36 in the structural block diagram of FIG. 5. The same processings as in the flowchart of FIG. 4 are denoted by the same reference number. The processings denoted by the same reference number may be similarly described as in the second embodiment, and hence the description thereof is omitted. FIG. 6 is different from FIG. 4 in that Step S207 corresponding to reception data restoration processing is added to the flowchart of FIG. 6.

According to the structural block diagram of FIG. 5 and the process flow illustrated in FIG. 6, when the amount of a command signal sent from the commanding apparatus 3, which is the demand, to the television lens 2 is increased, the answer data which is reduced by the sending data reduction unit 27 and sent from the television lens 2 to the commanding apparatus 3 is restored to original data by the reception data restoration unit 36 included in the commanding apparatus 3. To be specific, the data amount of the answer-a (Sig3), which is the position signal of the movable optical member and sent at regular intervals, is reduced to 1/m (m: arbitrary positive integer) by the sending data reduction unit 27 to obtain reduction data. The reduction data is increased by m times by interpolation by the reception data restoration unit 36 and then sent as the answer-b (Sig4) to the command control unit 31.

Therefore, as viewed from the command control unit 31 of the commanding apparatus 3 which is the demand, even when the amount of a command signal sent from the commanding apparatus 3 to the television lens 2 is increased, the signal amount of the answer-b (Sig4) does not change. Thus, in a structure as illustrated in FIG. 7 in which a wireless apparatus is additionally attached to a commanding apparatus having no wireless function so that control data may be sent and received to and from the television lens 2 through wireless communication, the amount of data processed in an existing commanding apparatus may be provided with compatibility.

Figure 7:
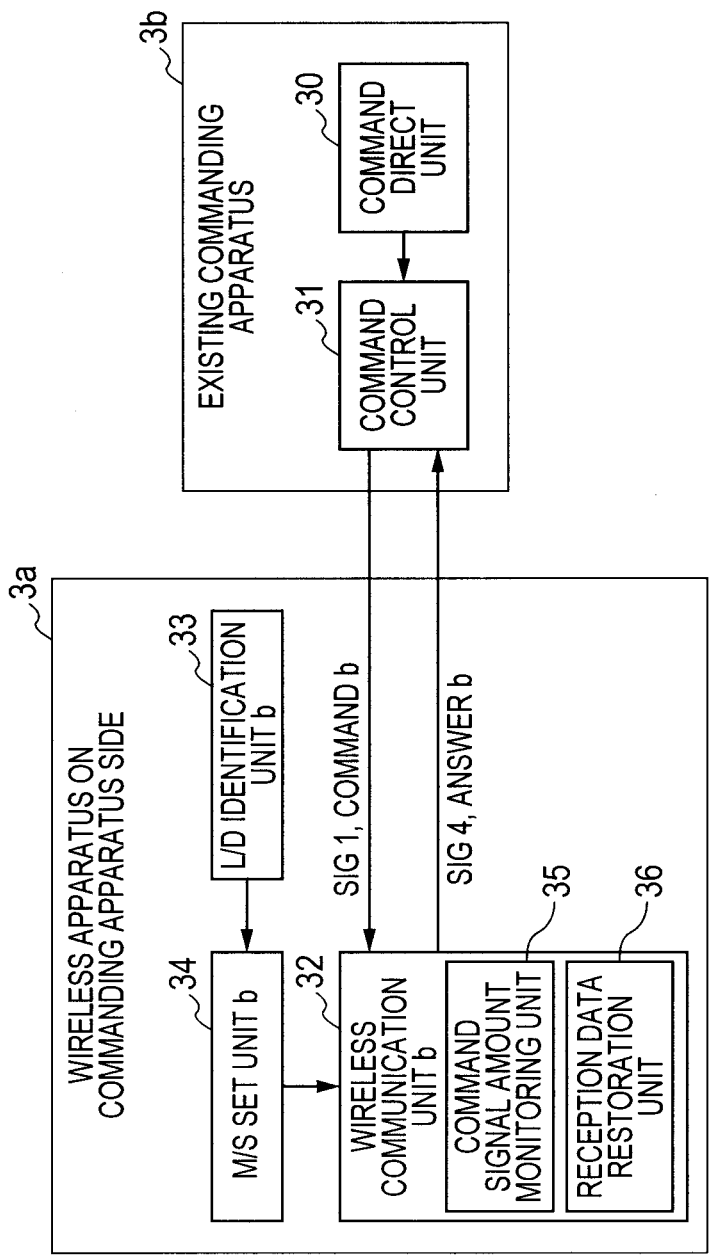
FIG. 7 is a block diagram illustrating the modified structure of a commanding apparatus illustrated in FIG. 5.

FIG. 7 illustrates a commanding apparatus side structure in a case where a wireless apparatus 3a located on a commanding apparatus side is connected to a conventional demand (existing commanding apparatus 3b) having no wireless function so as to provide a wireless function to the conventional demand, which is the same structure as in FIG. 5. As described above, the sending data reduction unit 27 and the reception data restoration unit 36 are provided, and hence the wireless communication of the existing demand may be achieved and a lens system which is excellent in responsiveness may be realized.

Further, the signal which is reduced by the sending data reduction unit 27 and restored by the reception data restoration unit 36 is the signal (data) indicating a position or a state of a member (optical system, optical member) whose position or state varies continuously, and is more specifically a response signal (answer signal, answer data) sent from the lens (lens apparatus) to the demand (commanding apparatus). Here, the member whose position or state varies continuously is not a member which can take only two or three values in position or state, but a member which can take at least ten or more values in position or state within whole movable area (state varying area). The member whose position or state varies continuously includes particularly a magnification-varying lens unit (zooming lens unit) which moves during zooming, a focus lens unit which moves during focusing, and a stop which moves (radially as perpendicularly to the optical axis) for adjustment of brightness as like. Here, a position of the magnification-varying lens unit may be its position obviously, or may be substituted by a focal length of the whole lens system (whole lens apparatus system). The position of the focus lens unit (focus position) can be substituted by an object distance (distance between the lens apparatus and an object).

On the other hand, a position or a state of a member (optical member, electrical switch, mechanical switch) whose position or state varies discontinuously can be exemplified by a position of an extender optical unit which is an optical unit including one or more optical units which can be inserted to and removed from its optical axis (a state whether or not the extender optical unit is positioned on its optical axis), an ON/OFF state of a return switch having a function for changing an image to be displayed on a view finder and other functions, and an ON/OFF state of a VTR (Video Tape Recorder) switch for determining whether or not a video-recording is performed by a camera apparatus on which the lens apparatus is mounted. That is, it is preferable that the member whose position or state varies discontinuously be a member which can take only two to five values in position or state, such as a switch which has only two positions and an extender optical unit which can dispose (switch to another extender) three optical elements (one or two optical elements may be applicable as well) different from each other in focal length (magnification) as an optical element to be disposed in optical axis in addition to a state in which no optical element having optical power is disposed on its optical axis. In this case, the extender can take four (or less) positions (or states). So, according to the definition described above in the present invention, the switch and the extender each are regarded as the member whose position or stated varies discontinuously.

In the present embodiment, the wireless communication is performed with data in which a part of date of the member whose position or state varies continuously is deleted whereas the reduction of date is not performed for the data of the member whose position or state varies discontinuously. In more detail, among the data of the member whose position or state varies continuously, a part of answer data (response signals) sent from the lens apparatus to the demand, that is, a part of the signal for informing the demand of the current position or the current state in response to a command from the demand, is deleted.

The deletion (reduction) of a part of data (signals) may be performed according to a determination of demand (by a determination unit included in the lens apparatus) with which the lens apparatus is communicating. Or, the deletion (reduction) may be performed according to a command sent from a command unit included in the demand to the lens apparatus to reduce data.

As described above, according to the structural block diagrams of FIGS. 5 and 7 and the process flow illustrated in FIG. 6, the amount of command data sent from the commanding apparatus 3 to the television lens 2 is detected, and when the amount of command data is larger than a threshold value which is set in advance, the amount of answer data sent from the television lens 2 to the commanding apparatus 3 is reduced. In this manner, even in cases of not only an analog type demand but also a digital type demand of which the amount of command data is large, a lens system which is excellent in responsiveness may be provided.

Particularly in FIG. 7, the output command signal Sig1 of the existing command value 3b can be an analog signal or a digital command signal. The amount of information is small in the case in which the output command signal Sig1 is the analog signal, whereas the amount of information is large in the case in which the output command signal Sig1 is the digital command signal. And the wireless communication apparatus 3a on the command apparatus side may make the sending data reduction unit 27 and the reception data restoration unit 36 disabled in response to the detection of the communication with analog type demand.

Fourth Embodiment

Figure 8:
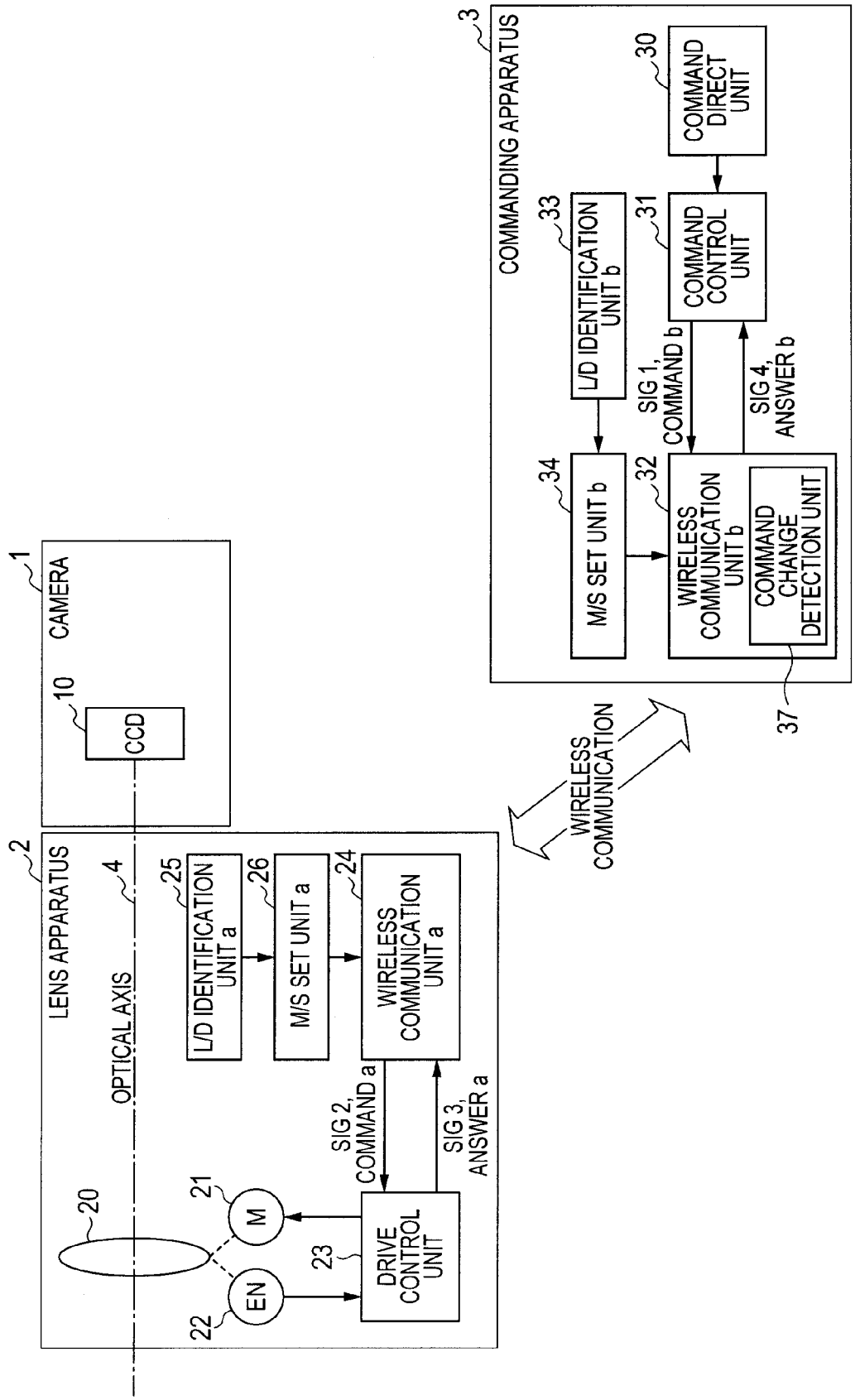
FIG. 8 a block diagram illustrating a structure according to a fourth embodiment of the present invention.

FIG. 8 is a block diagram illustrating a structure according to a fourth embodiment of the present invention. The same blocks as the structural blocks in the first embodiment illustrated in FIG. 1 are denoted by the same reference number. The blocks denoted by the same reference number may be similarly described as in the first embodiment, and hence the description thereof is omitted. FIG. 8 is different from FIG. 1 in that a command change detection unit 37 is further provided in the wireless communication unit-b 32.

Figure 9:
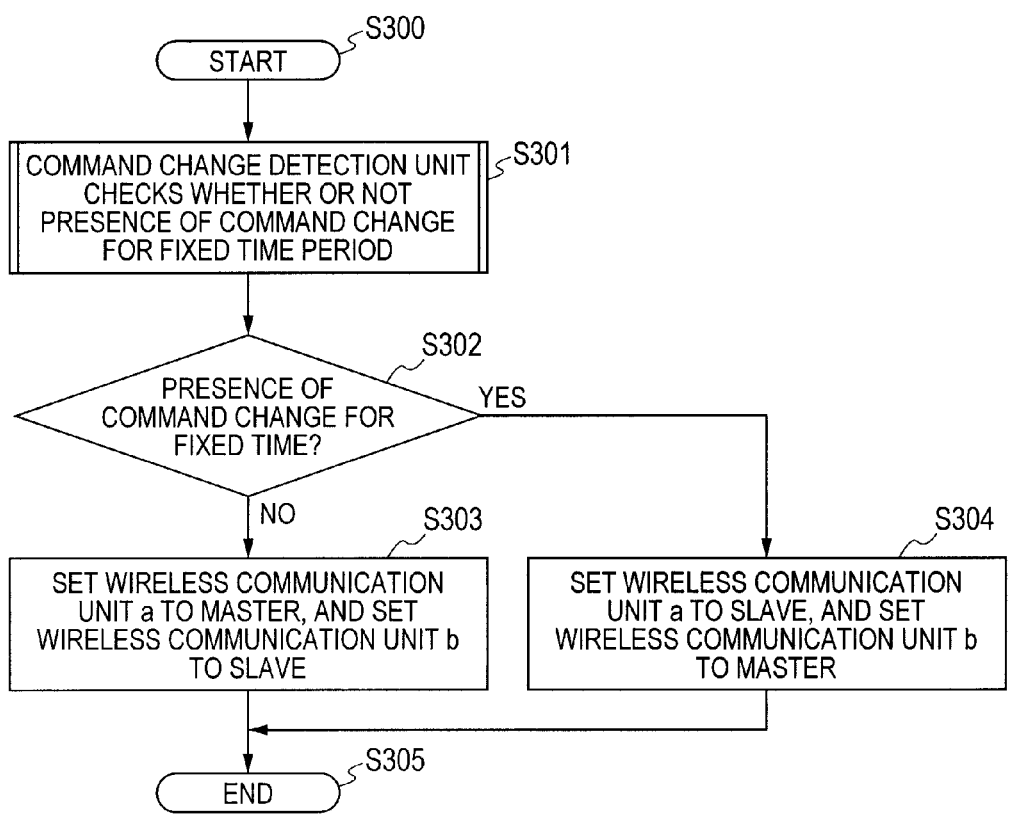
FIG. 9 is a flowchart illustrating a master/slave setting process in the fourth embodiment of the present invention.

FIG. 9 is a flowchart illustrating a master/slave setting process flow for the structural block diagram of FIG. 8 and a description is made thereto. In FIG. 9, the processing starts in Step S300, and the processing proceeds to Step S301. In Step S301, it is detected, by the command change detection unit 37, whether or not the command value of the commanding apparatus 3 is changed (whether or not command direct unit 30 is operated) within a fixed time period. Subsequently, the processing proceeds to Step S302 which is determination processing. When the command change detection unit 37 detects that the command value is not changed within the fixed time period, the processing proceeds to Step S303. When the command value is changed, the processing proceeds to Step S304. In Step S303, the wireless communication unit-a 24 is set as the master while the wireless communication unit-b 32 is set as the slave, and the processing proceeds to Step S305. In contrast, in Step S304, the wireless communication unit-a 24 is set as the slave while the wireless communication unit-b 32 is set as the master, and the processing proceeds to Step S305. The processing ends in Step S305.

As described above, according to the structural block diagram of FIG. 8 and the process flow illustrated in FIG. 9, when the command value sent from the commanding apparatus 3 to the television lens 2 is not changed within a fixed time period, the wireless communication unit-a 24 is set as the master and the wireless communication unit-b is set as the slave. In addition, when the command value is changed, the wireless communication unit-a 24 is set as the slave and the wireless communication unit-b 32 is set as the master. When the processing described above is performed, a lens system which is excellent in responsiveness may be provided while the commanding apparatus such as the demand is operated by an operator. When the demand is not operated by the operator, the wireless communication unit-b 32 is set as the slave, and hence the electric consumption of the commanding apparatus 3 may be reduced. Thus, when the commanding apparatus 3 is battery-operated, a lens system which is excellent in responsiveness and low in electric consumption may be provided.

Fifth Embodiment

This embodiment relates to an image pickup system which includes: the image pickup apparatus main body (television camera) 1 having the image pickup device 10; and the lens system (having lens apparatus 2 and commanding apparatus 3) according to any one of Embodiments 1 to 4. The lens apparatus 2 included in the lens system (having lens apparatus 2 and commanding apparatus 3) is detachably attachable to the image pickup apparatus main body 1.

According to the structure of this embodiment, an image pickup system which is excellent in responsiveness and low in electric consumption may be realized.

Sixth Embodiment

This embodiment relates to the lens apparatus 2. The lens apparatus 2 includes the movable optical member 20, the wireless communication unit 24 for performing wireless communication with the commanding apparatus 3 for generating a command signal to drive the movable optical member 20 through the master/slave communication system, and the set units (25 and 26) for setting the wireless communication unit 24 as the slave when the lens apparatus is initialized. The lens apparatus 2 is detachably attachable to the image pickup apparatus main body 1 having the image pickup device 10.

With the structure according to this embodiment, the lens apparatus 2 which is excellent in responsiveness and low in electric consumption may be realized.

Seventh Embodiment

This embodiment relates to the commanding apparatus 3 for outputting, to the lens apparatus 2 including the movable optical member 20, a command signal to drive the movable optical member 20. The commanding apparatus 3 includes: the wireless communication unit 32 for performing wireless communication with the wireless communication unit 24 included in the lens apparatus 2 through the master/slave communication system; and the set units (33 and 34) for setting the wireless communication unit 32 as the master when the commanding apparatus 3 is initialized.

With the structure according to this embodiment, an image pickup system which is excellent in responsiveness and low in electric consumption may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298394, filed Dec. 28, 2009, which is hereby incorporated by reference herein in its entirety.

What is claimed is:

1. A lens system comprising:
a lens apparatus including a first member whose position or state is continuously variable and a second member whose position or state is discontinuously variable; and
a commanding apparatus that outputs a command signal to the first member and the second member,
wherein the lens apparatus includes:
   a first wireless communication unit that performs wireless communication through a master/slave communication system;
   a first setting unit that sets the first wireless communication unit as a slave when the lens apparatus is initialized;
   a driving controller that generates first data regarding the position or state of the first member and second data regarding the position or state of the second member; and
   a data reduction unit that reduces the first data, but does not reduce the second data,
   wherein the lens apparatus sends the first data and the second data to the command apparatus, and
wherein the commanding apparatus includes:
   a second wireless communication unit that performs wireless communication through the master/slave communication system and communicates with the first wireless communication unit; and
   a second setting unit that sets the second wireless communication unit as a master when the commanding apparatus is initialized.

2. A lens system according to claim 1, wherein the data reduction unit performs data reduction so that an amount of data after the data reduction is 1/m of the amount of the first data before the data reduction, where m is an arbitrary positive integer, of the first data of the first member.

3. A lens system according to claim 1, wherein the commanding apparatus further comprises a data restoration unit that restores an amount of data of the first data due to the data reduction.

4. A lens system according to claim 1, wherein the data reduction unit reduces an amount of data associated with one of a zoom position, a focus position, or an iris position of the first data.

5. A lens system according to claim 1, wherein:
the commanding apparatus further comprises a command change detection unit that detects whether or not the command signal is changed within a fixed time period, and
when the command signal is not changed within the fixed time period, the first setting unit sets the first wireless communication unit as the master and the second setting unit sets the second wireless communication unit as the slave.

6. An image pickup system comprising:
an image pickup apparatus main body including an image pickup device; and
a lens system comprising:
a lens apparatus including a first member whose position or state is continuously variable and a second member whose position or state is discontinuously variable; and
a commanding apparatus that outputs a command signal to the first member and the second member,
wherein the lens apparatus is detachably attachable to the image pickup apparatus main body, and includes:
   a first wireless communication unit that performs wireless communication through a master/slave communication system;
   a first setting unit that sets the first wireless communication unit as a slave when the lens apparatus is initialized; and
   a driving controller that generates first data regarding the position or state of the first member and second data regarding the position or state of the second member; and
   a data reduction unit that reduces the first data, but does not reduce the second data,
   wherein the lens apparatus sends the first data and the second data to the command apparatus, and
wherein the commanding apparatus includes:
   a second wireless communication unit that performs wireless communication through the master/slave communication system and communicates with the first wireless communication unit; and
   a second setting unit that sets the second wireless communication unit as a master when the commanding apparatus is initialized.

7. A lens apparatus detachably attachable to an image pickup apparatus main body including an image pickup device, the lens apparatus comprising:
   a first member whose position or state is continuously variable and a second member whose position or state is discontinuously variable;
   a first wireless communication unit that performs wireless communication with a commanding apparatus that outputs a command signal to the first member and the second member through a master/slave communication system;
   a driving controller that generates first data regarding the position or state of the first member and second data regarding the position or state of the second member; and
   a data reduction unit that reduces the first data but does not reduce the second data.

8. A commanding apparatus for outputting a command signal to a lens apparatus that is detachably attachable to an image pickup apparatus having a main body with an image pickup device,
   wherein the lens apparatus comprises:
   a first member whose position or state is continuously variable and a second member whose position or state is discontinuously variable;
   a first wireless communication unit that performs wireless communication for communicating the command signal from the commanding apparatus to the first and second members through a master/slave communication system; and
   a driving controller that generates first data regarding the position or state of the first member and second data regarding the position or state of the second member;
   a data reduction unit that reduces the first data, but does not reduce the second data,
   wherein the lens apparatus sends the first data and the second data to the command apparatus, and wherein the command apparatus comprises:
a second wireless communication unit that performs wireless communication with the first wireless communication unit, through the master/slave communication system;
a setting unit that sets the second wireless communication unit as a master when the commanding apparatus is initialized; and
a commanding unit that outputs a command to the data reduction unit to cause the data reduction unit to reduce first data to be sent from the first wireless communication unit to the second wireless communication unit.

9. A lens system comprising:
a lens apparatus including:
   a first movable unit whose status is continuously variable;
   a second movable unit whose status is discontinuously variable;
   a control unit that controls the first movable unit and the second movable unit; and
   a signal generating unit that generates first status data regarding a status of the first movable unit and second status data regarding a status of the second movable unit; and
a commanding apparatus that outputs command data to control the first movable unit and the second movable unit;
a first wireless communication apparatus that transmits the first status data and the second status data from the lens apparatus to the commanding apparatus wirelessly; and
a second wireless communication apparatus that transmits the command data from the commanding apparatus to the lens apparatus wirelessly,
wherein the first wireless communication apparatus includes a data reduction unit that reduces the first status data before transmitting to the commanding apparatus.

10. A lens system according to claim 9, wherein the status includes position or state of the first movable unit and the second movable unit.

11. A lens system according to claim 9, wherein the first movable unit is at least one of a zoom lens, a focus lens, or an iris.

12. A lens system according to claim 9, wherein the status of the first movable unit within an entire movable area holds at least ten values.

13. A lens system comprising:
a lens apparatus including:
   a first movable unit whose status is continuously variable;
   a second movable unit whose status is discontinuously variable;
   a control unit that controls the first movable unit and the second movable unit; and
   a signal generating unit that generates first status data regarding a status of the first movable unit and second status data regarding a status of the second movable unit;
a commanding apparatus that outputs command data to control the first movable unit and the second movable unit;
a first wireless communication apparatus that transmits the first status data and the second status data from the lens apparatus to the commanding apparatus wirelessly; and
a second wireless communication apparatus that transmits the command data from the commanding apparatus to the lens apparatus wirelessly,
wherein the lens apparatus further includes a data reduction unit that reduces the first status data before transmitting to the commanding apparatus.

14. A lens system according to claim 13, wherein the status includes position or state of the first movable unit and the second movable unit.

15. A lens system according to claim 13, wherein the first movable unit is at least one of a zoom lens, a focus lens, or an iris.

16. A lens system according to claim 13, wherein the status of the first movable unit within an entire movable area holds at least ten values.

17. A lens system comprising:
a lens apparatus including:
   a first movable unit whose status is continuously variable;
   a second movable unit whose status is discontinuously variable;
   a control unit that controls the first movable unit and the second movable unit; and
   a signal generating unit that generates first status data regarding a status of the first movable unit and second status data regarding a status of the second movable unit; and
a commanding apparatus that outputs command data to control the first movable unit and the second movable unit,
wherein the lens apparatus further includes:
   a first wireless communication unit that transmits the first status data and the second status data to the commanding apparatus wirelessly; and
   a data reduction unit that reduces the first status data before transmitting to the commanding apparatus, and
wherein the commanding apparatus includes a second wireless communication unit that transmits the command data to the lens apparatus wirelessly.

18. A lens system according to claim 17, wherein the status includes position or state of the first movable unit and the second movable unit.

19. A lens system according to claim 17, wherein the first movable unit is at least one of a zoom lens, a focus lens, or an iris.

20. A lens system according to claim 17, wherein the status of the first movable unit within an entire movable area holds at least ten values.

21. A lens system comprising:
a lens apparatus including:
   a first movable unit whose status is continuously variable;
   a second movable unit whose status is discontinuously variable;
   a control unit that controls the first movable unit and the second movable unit; and
   a signal generating unit that generates first status data regarding a status of the first movable unit and second status data regarding a status of the second movable unit;
a commanding apparatus that outputs command data to control the first movable unit and the second movable unit;
a first wireless communication apparatus that transmits part of the first status data from the lens apparatus to the commanding apparatus wirelessly; and
a second wireless communication apparatus that transmits the command data from the commanding apparatus to the lens apparatus wirelessly.

22. A lens system according to claim 21, wherein the status includes position or state of the first movable unit and the second movable unit.

23. A lens system according to claim 21, wherein the first movable unit is at least one of a zoom lens, a focus lens, or an iris.

24. A lens system according to claim 21, wherein the status of the first movable unit within an entire movable area holds at least ten values.

25. A lens system comprising:
a lens apparatus including:
a first movable unit whose status is continuously variable;
a second movable unit whose status is discontinuously variable;
a control unit that controls the first movable unit and the second movable unit; and
a signal generating unit that generates first status data regarding a status of the first movable unit and second status data regarding a status of the second movable unit; and
a commanding apparatus that outputs command data to control the first movable unit and the second movable unit,
wherein the lens apparatus further includes a first wireless communication unit that transmits part of the first status data to the commanding apparatus wirelessly, and
wherein the commanding apparatus includes a second wireless communication unit that transmits the command data to the lens apparatus wirelessly.

26. A lens system according to claim 25, wherein the status includes position or state of the first movable unit and the second movable unit.

27. A lens system according to claim 25, wherein the first movable unit is at least one of a zoom lens, a focus lens, or an iris.

28. A lens system according to claim 25, wherein the status of the first movable unit within an entire movable area holds at least ten values.

29. A lens apparatus comprising:
a first movable unit whose status is continuously variable;
a second movable unit whose status is discontinuously variable;
a control unit that controls the first movable unit and the second movable unit according to command data from a commanding apparatus;
a signal generating unit that generates first status data regarding a status of the first movable unit and second status data regarding a status of the second movable unit;
a wireless communication unit that communicates with the commanding apparatus wirelessly and transmits the first status data and the second status data from the signal generating unit to the commanding apparatus; and
a data reduction unit that reduces the first status data before transmitting to the commanding apparatus.

30. A lens apparatus according to claim 29, wherein the status includes position or state of the first movable unit and the second movable unit.

31. A lens apparatus according to claim 29, wherein the first movable unit is at least one of a zoom lens, a focus lens, or an iris.

32. A lens apparatus according to claim 29, wherein the status of the first movable unit within an entire movable area holds at least ten values.

33. A lens apparatus comprising:
a first movable unit whose status is continuously variable;
a second movable unit whose status is discontinuously variable;
a control unit that controls the first movable unit and the second movable unit according to command data from a commanding apparatus;
a signal generating unit that generates first status data regarding a status of the first movable unit and second status data regarding a status of the second movable unit;
a wireless communication unit that communicates with the commanding apparatus wirelessly and transmits the first status data and second status data from the signal generating unit to the commanding apparatus,
wherein the wireless communication unit includes a data reduction unit that reduces the first status data before transmitting to the commanding apparatus.

34. A lens apparatus according to claim 33, wherein the status includes position or state of the first movable unit and the second movable unit.

35. A lens apparatus according to claim 33, wherein the first movable unit is at least one of a zoom lens, a focus lens, or an iris.

36. A lens apparatus according to claim 33, wherein the status of the first movable unit within an entire movable area holds at least ten values.

37. A lens apparatus comprising:
a first movable unit whose status is continuously variable;
a second movable unit whose status is discontinuously variable;
a control unit that controls the first movable unit and the second movable unit according to command data from a commanding apparatus;
a signal generating unit that generates first status data regarding a status of the first movable unit and second status data regarding a status of the second movable unit; and
a wireless communication unit that communicates with the commanding apparatus wirelessly and transmits part of the first status data from the signal generating unit to the commanding apparatus.

38. A lens apparatus according to claim 37, wherein the status includes position or state of the first movable unit and the second movable unit.

39. A lens apparatus according to claim 37, wherein the first movable unit is at least one of a zoom lens, a focus lens, or an iris.

40. A lens apparatus according to claim 37, wherein the status of the first movable unit within an entire movable area holds at least ten values.

41. A wireless communication system for transmitting command data to control a first movable unit of a lens apparatus whose status is continuously variable and a second movable unit whose status is discontinuously variable, the wireless communication system comprising:
a first wireless communication unit that transmits first status data regarding a status of the first movable unit and second status data regarding a status of the second movable unit from the lens apparatus to a commanding apparatus wirelessly;
a second wireless communication unit that transmits the command data from the commanding apparatus to the lens apparatus wirelessly,
wherein the first wireless communication unit includes a data reduction unit that reduces the second status data before transmitting to the commanding apparatus wirelessly.

42. A commanding apparatus for outputting a command signal to a lens apparatus,
wherein the lens apparatus comprises:
a first movable unit whose status is continuously variable;
a second movable unit whose status is discontinuously variable;
a control unit that controls the first movable unit and the second movable unit according to command data from a commanding apparatus;
a signal generating unit that generates first status data regarding a status of the first movable unit and second status data regarding a status of the second movable unit;
a first wireless communication unit that communicates with the commanding apparatus wirelessly and transmits the first status data and the second status data from the signal generating unit to the commanding apparatus; and
a data reduction unit that reduces the first status data before transmitting to the commanding apparatus,
wherein the command apparatus comprises:
a second wireless communication unit that communicates with the lens apparatus wirelessly and transmits the command data to the lens apparatus; and
a commanding unit that outputs a command to the data reduction unit to cause the data reduction unit to reduce the first status data to be transmitted from the first wireless communication unit to the second wireless communication unit.

43. A commanding apparatus for outputting a command signal to a lens apparatus,
wherein the lens apparatus comprises:
a first movable unit whose status is continuously variable;
a second movable unit whose status is discontinuously variable;
a control unit that controls the first movable unit and the second movable unit according to command data from a commanding apparatus;
a signal generating unit that generates first status data regarding a status of the first movable unit and second status data regarding a status of the second movable unit; and
a first wireless communication unit that communicates with the commanding apparatus wirelessly and transmits part of the first status data from the signal generating unit to the commanding apparatus,
wherein the command apparatus comprises:
a second wireless communication unit that communicates with the lens apparatus wirelessly and transmits the command data to the lens apparatus; and
a commanding unit that outputs a command to the first wireless communication unit to transmit part of the first status data from the first wireless communication unit to the second wireless communication unit.

* * * * *